UNITED STATES PATENT OFFICE 2,363,870

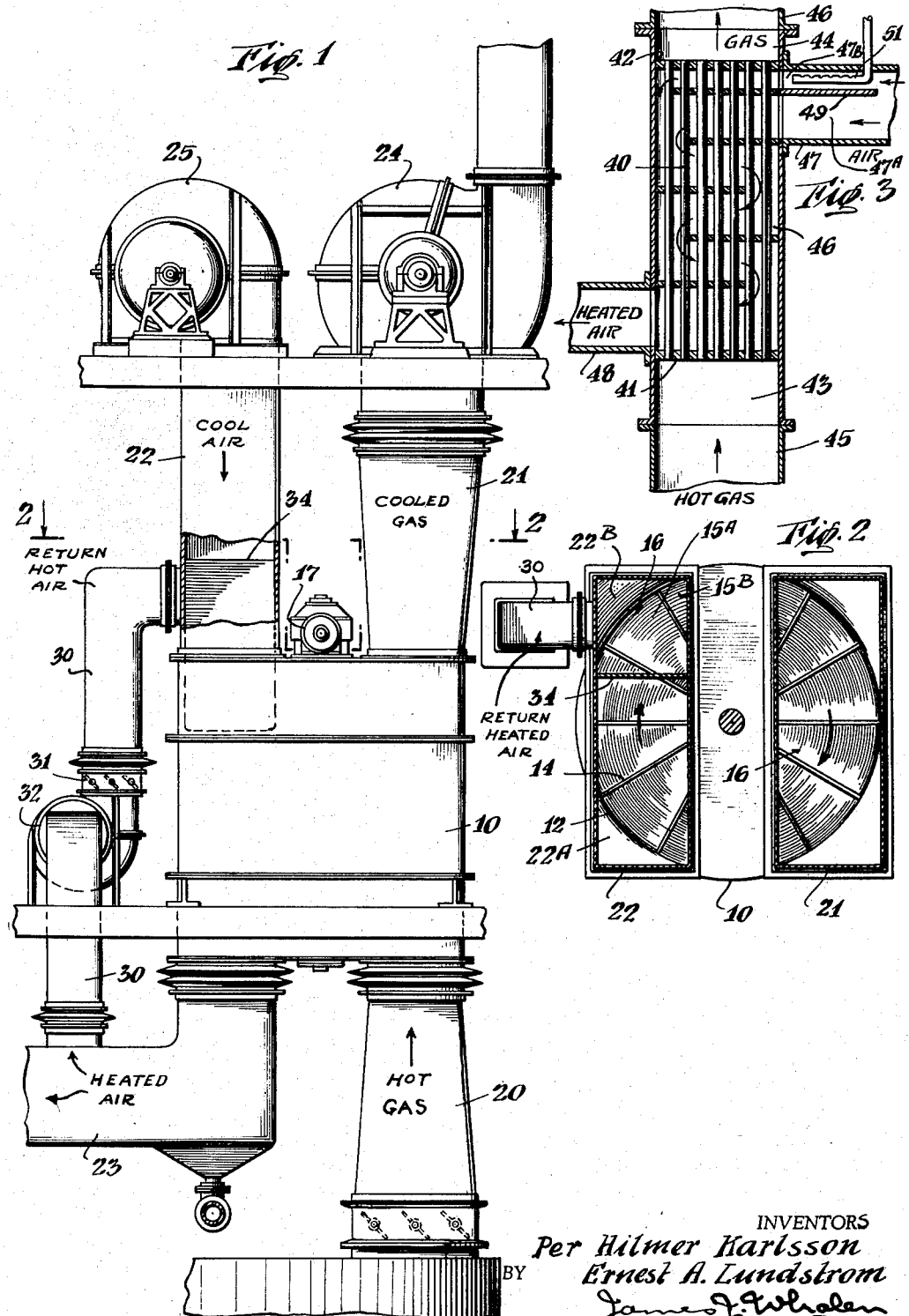

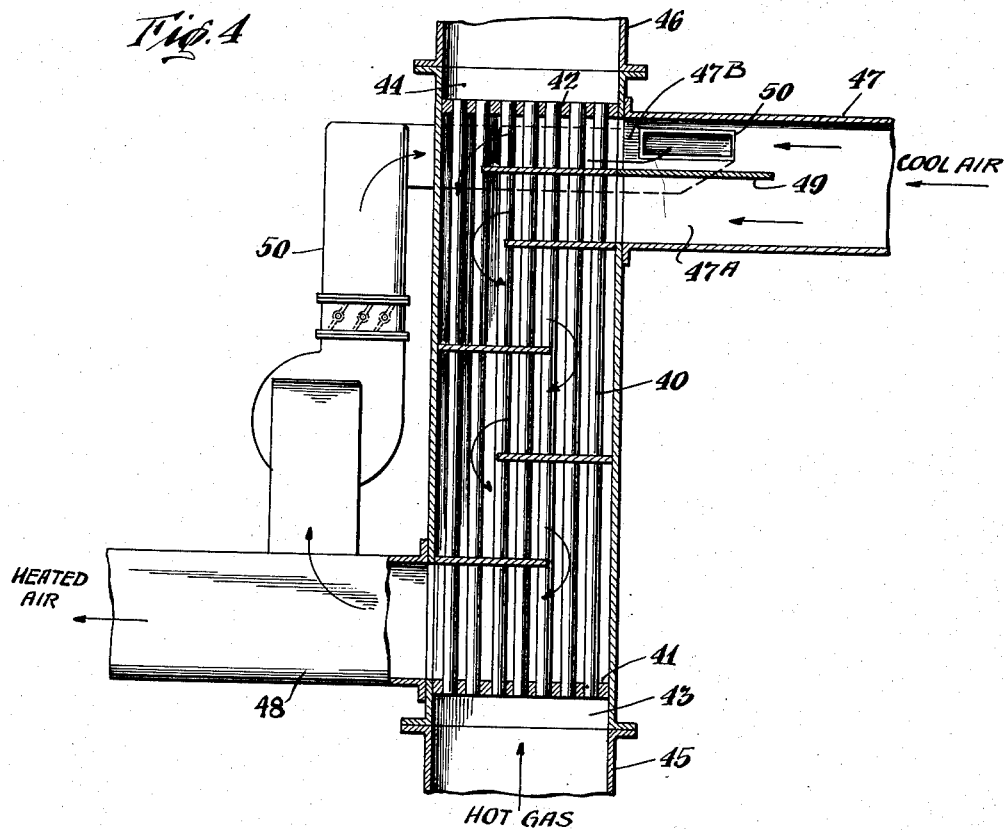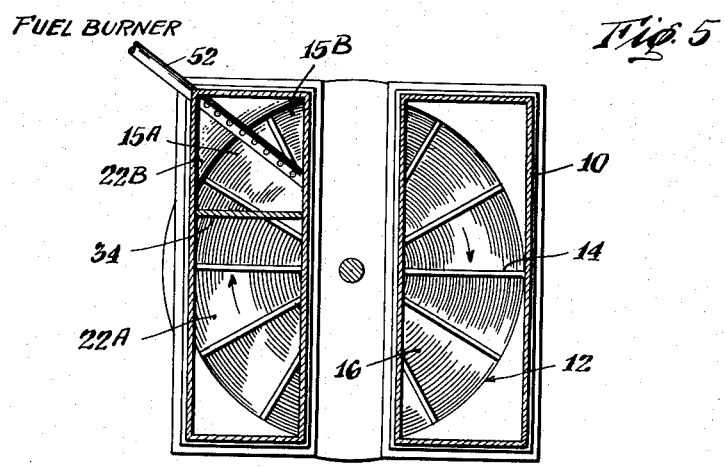

TEMPERATURE CONTROL OF HEAT TRANSFER SURFACES

Per Hilmer Karlsson, Wellsville, and Ernest A. Lundstrom, New York, N. Y., assignors to The Air Preheater Corporation, New York, N. Y.

Application October 10, 1941, Serial No. 414,420

7 Claims. (Cl. 257—6)

This invention relates to air preheaters and particularly to improved means for minimizing corrosion of the heat transfer surfaces.

When air preheaters are subjected to such conditions that the temperature of the metallic heat transfer surface is at or below the dew point of the heating gases entering the preheater moisture is condensed from the gases and causes corrosion of these surfaces. Such conditions ordinarily exist when the boiler with which the preheater is associated is operating at low loads and, as a consequence, the volume and temperature of the flue gases is sometimes inadequate to maintain the heat transfer surfaces of the preheater at a temperature above the dew point of the gases.

The present invention contemplates dividing the air inlet duct of a preheater into two separate parts and directing through one of these the air that flows over the coolest portion of the heat absorbing surface of the preheater. Before reaching the heat transfer surface of the preheater the air flowing through this part of the air inlet duct is heated to a temperature above that of the main stream of air supplied to the air heater.

According to one form of the invention the preheating of this part of the air supply is effected by mixing therewith some of the air which has been heated in flowing through the heater. This heated air is returned to the inlet duct through a conduit extending from the air outlet duct and connecting into the air inlet duct in the region where the latter communicates directly with the part of the air passage containing the coolest portion of the heat transfer surface of the preheater.

In another embodiment of the invention the temperature of the air that is to flow over the coolest portions of the preheater surface is raised by a gas burner (or other heating device) disposed in the portion of the air inlet duct through which this part of the air flows.

The invention will be best understood upon consideration of the following detailed description of two illustrative embodiments of the invention when read in conjunction with the accompanying drawings in which:

Figure 1 is an elevational view of an air preheater of the Ljungstrom rotary, regenerative type embodying the invention.

Figure 2 is a sectional view on the line 2—2 in Fig. 1 showing the air inlet and gas outlet ducts in section;

Figure 3 is a sectional elevation of a tubular air preheater embodying the invention and utilizing a separate heating device for raising the temperature of part of the air before it enters the preheater;

Fig. 4 is a sectional elevation of a tubular preheater wherein part of the preheated air is returned to a section of the air inlet duct; and Fig. 5 is a sectional plan view similar to Fig. 2 but illustrating the employment of a separate heating device for raising the temperature of part of the air at the preheater inlet.

In Figures 1 and 2 the numeral 10 designates the housing of a rotary, regenerative air preheater of the Ljungstrom type having a cylindrical rotor 12 divided by radial partitions or diaphragms 14 into a plurality of sector shaped compartments. Each compartment of the rotor contains regenerative heat transfer surface in the form of undulated or corrugated plates 16 which first absorb heat from hot flue gases in passing through the gas side of the preheater and then impart it to air passing through the air side of the preheater as the rotor is turned slowly about its axis by a motor 17 operating through suitable reduction gearing. The usual sector plates provided at the ends of the housing 10 opposite the rotor 12 are formed with openings placing the rotor in communication with the ducts for gas and air. In Figs. 1 and 2 of the drawings the inlet and outlet ducts for gas are designated 20 and 21 while those for air are numbered 22 and 23, respectively. An induced draft fan 24 and a forced draft fan 25 are associated with the gas outlet duct 21 and the air inlet duct 22 respectively.

As related above the invention contemplates raising the temperature of the stream of air passing over the coolest portion of the heat transfer surface, i. e. the regenerative material in the compartments 15A, 15B which are about to pass from the air side of the preheater and enter the gas side after having yielded their heat to the air. A transverse partition 34 in the air inlet duct 22 divides it into major and minor parts 22A, 22B, respectively the smaller part 22B of the duct is left open at its upper end to receive cool air from fan 25 and at its lower end communicates directly with the part of the air passage in which the coolest portion of the regenerative material is located. Some of the heated air from the outlet duct 23 is returned to this part 22B of the inlet duct opposite the portion of the air passage through which these sectors 15A, 15B of the rotor are moving. The conduit 30 is provided with dampers 31 for regulating the flow of air therethrough and a fan 32 for withdrawing heated air from the outlet duct 23.

It will be noted that in accordance with the present invention the returned heated air is concentrated in a definite area of the air passage, which area is that in communication with the coolest portion of the regenerative material immediately before the latter exits from the air passage on its way to the gas passage. Consequently when entering the gas passage the heat transfer surface is maintained at a temperature above the dew point of the gases.

Figure 3 illustrates the invention embodied in a tubular air preheater having tubes 40 connected into tube plates 41 and 42 that form the inner walls of the gas inlet chamber 43 and gas outlet chamber 44 of the preheater to which the gas inlet duct 45 and the gas outlet duct 46 connect. The air to be preheated enters and leaves the chamber 46 in which the tubes 40 are located through the air inlet duct 47 and the air outlet duct 48. In a tubular air preheater the heat is transferred through the tube walls and the coldest portion of the heat transfer surface is constituted by the end portions of the tubes immediately adjacent the gas outlet chamber 44. As in the rotary heater illustrated in Figs. 1 and 2 the air inlet duct 47 is divided by an axially extending partition 49 into a major and a minor part 47A and 47B, the latter being the part of the air duct connected to the heater adjacent the location of the cold ends of the tubes 40. For the purpose of raising the temperature of the air stream flowing through the part 47B of the air inlet duct above the temperature of the stream flowing through the part 47A, some of the heated air may be returned to the duct part 47B through a conduit 50 (Fig. 4) communicating with the air outlet duct 48. However, in the arrangement illustrated in Fig. 3 the desired increase in temperature is attained by means of a gas burner 51 located in the portion 47B of the air inlet duct. Obviously, other forms of heating devices might be located in this part of the duct. Likewise instead of returning air to the air inlet duct 22 of the regenerative type of air preheater shown in Figs. 1 and 2 a suitable heating device 52 might be provided in the portion 22B of the air inlet duct that is opposite the coolest portion of the regenerative material carried by the rotor 12.

What we claim is:

1. In an air preheater having a gas passage, an air passage and heat transfer surface to absorb heat from hot gases passing through said gas passage and impart it to air passing through said air passage; a duct connected to supply air to and distribute it uniformly over the cross-sectional area of the air passage; a transverse partition in said duct adjacent the air inlet to said preheater subdividing said duct into a major and a minor part, the latter being opposite and supplying air to that portion of the air passage in which the coolest portion of said heat transfer surface is located; and means for raising the temperature of the air flowing through said minor portion of said duct to enter said air passage above that of the air entering the air passage through said major part of said duct.

2. In regenerative heat exchange apparatus having passages for a heating gas and air or other gaseous fluid to be heated, ducts for supplying hot gas and relatively cool air to and for withdrawing the cooled gas and heated air from said passages, and a rotor divided into a plurality of compartments containing regenerative material adapted to be moved first through the gas passage and then into the air passage; a conduit extending from the hot air outlet duct and connecting into the portion of the cool air inlet duct that communicates directly with said air passage in the region where the regenerative material in said rotor compartments leaves the air passage of the preheater on its way to the gas passage as the rotor turns.

3. In regenerative heat exchange apparatus having passages for a heating gas and air or other gaseous fluid to be heated, ducts for supplying hot gas and relatively cool air to and for withdrawing the cooled gas and heated air from said passages, and a rotor divided into a plurality of compartments containing regenerative material adapted to be moved first through the gas passage and then into the air passage; a conduit extending from the hot air outlet duct and connecting into the portion of the cool air inlet duct that communicates directly with said air passage in the region where the regenerative material in said rotor compartments leaves the air passage of the preheater on its way to the gas passage as the rotor turns; a fan for withdrawing heated air from said outlet duct and circulating it through said conduit, and dampers in said conduit for regulating the flow of air therethrough.

4. In regenerative heat exchange apparatus having passages for a heating gas and air or other gaseous fluid to be heated, ducts for supplying hot gas and relatively cool air to and for withdrawing the cooled gas and heated air from said passages, and a rotor divided into a plurality of compartments containing regenerative material adapted to be moved first through the gas passage and then into the air passage; a conduit extending from the hot air outlet duct and connecting into the portion of the cool air inlet duct that communicates directly with said air passage in the region where the regenerative material in said rotor compartments leaves the air passage of the preheater on its way to the gas passage as the rotor turns, and a partition extending axially of said air inlet duct and located therein so as to direct said returned heated air to the regenerative material in rotor compartments about to exit from the air passage.

5. An air preheater as defined in claim 1 wherein a fuel burner or other heating device is disposed in the minor portion of said air inlet duct for heating the air passing to the coolest part of the heat transfer surface in said air passage.

6. In regenerative heat exchange apparatus having passages for a heating gas and air or other gaseous fluid to be heated, ducts for supplying hot gas and relatively cool air to and for withdrawing the cooled gas and heated air from said passages, and a rotor divided into a plurality of compartments containing regenerative material adapted to be moved first through the gas passage and then into the air passage; a transverse partition extending axially of the air inlet duct immediately adjacent the rotor and dividing it transversely into a major and minor portion, said minor portion communicating directly with the air passage in the region where the regenerative material in said rotor compartments leaves the air passage of the preheater on its way to the gas passage as the rotor turns; and a fuel burner or other heating device disposed in said minor portion of the air inlet duct for heating the air passing therethrough to the regenerative material in the rotor compartments about to exit from the air passage.

7. In an air preheater having a gas passage, an air passage and heat transfer surface to absorb heat from hot gases passing through said gas passage and impart it to air passing through said air passage; a duct connected to supply air to and distribute it uniformly over the cross-sectional area of the air passage; a transverse partition in said duct adjacent the air inlet to said preheater subdividing said duct into a major and a minor part, the latter being opposite and supplying air to that portion of the air passage in which the coolest portion of said heat transfer surface is located; a conduit extending from the hot air outlet duct and connecting into said minor portion of the cool air inlet duct; and a fan for withdrawing heated air from said outlet duct and circulating it through said conduit to contact the regenerative material in said rotor compartments as it leaves the air passage of the preheater on its way to the gas passage as the rotor turns.

PER HILMER KARLSSON.
ERNEST A. LUNDSTROM.